United States Patent [19]

Ikeda et al.

[11] Patent Number: 4,968,108
[45] Date of Patent: Nov. 6, 1990

[54] METHOD FOR CONSTRUCTING AND RECONSTRUCTING HOLOGRAM

[75] Inventors: Hiroyuki Ikeda, Yokohama; Fumio Yamagishi, Ebina; Masayuki Kato; Shunji Kitagawa, both of Atsugi; Takefumi Inagaki, Kawasaki, all of Japan

[73] Assignee: Fujitsu Limited, Kawasaki, Japan

[21] Appl. No.: 356,679

[22] Filed: May 24, 1989

Related U.S. Application Data

[63] Continuation of Ser. No. 655,572, Sep. 28, 1984, abandoned.

[30] Foreign Application Priority Data

May 14, 1984 [JP] Japan .................................. 58-183096
Oct. 3, 1984 [JP] Japan .................................. 59-94700

[51] Int. Cl.$^5$ .................................................. G03H 1/04
[52] U.S. Cl. ....................................... 350/3.7; 350/3.83
[58] Field of Search ............................. 350/3.7–3.72, 350/162.2, 3.83

[56] References Cited

U.S. PATENT DOCUMENTS

| 3,940,204 | 2/1976 | Withrington | 350/3.72 |
| 4,378,142 | 3/1983 | Ono | 350/3.71 |
| 4,416,505 | 11/1983 | Dickson | 350/3.71 |

FOREIGN PATENT DOCUMENTS

| 55-77715 | 6/1980 | Japan | 350/3.71 |
| 56-32167 | 4/1981 | Japan | 350/3.71 |

OTHER PUBLICATIONS

Dickson, "Scan Angle Multiplication in a Holographic Scanner," IBM Technical Disclosure Bulletin, vol. 23, No. 9, Feb. 1981,, pp. 4240–4241.
Y. Belvaus, "Influence de divers parametres d'enregistrement lors de la restitution d'un hologramme", NOUVELLE REVUE D'OPTIGUE, vol. 6, No. 3, 1975, pp. 137–147, Paris, FR, Chapters II.2, II.3, II.4, III.
LeRoy D. Dickson et al., "Holography in the IBM 3687 Supermarket Scanner", IBM Journal of Research and Development, vol. 26, No. 2, Mar. 1982, pp. 228–234.
J. Woznicki, "Geometry of Recording and Color Sensitivity for Evanescent Wave Holography using a Gaussian Beam", APPLIED OPTICS, vol. 19, No. 4, Feb. 15, 1980, pp. 631–637, Optical Society of America, New York.

Primary Examiner—Eugene R. Laroche
Assistant Examiner—Martin Lerner
Attorney, Agent, or Firm—Staas & Halsey

[57] ABSTRACT

A method for constructing and reconstructing a hologram. The hologram is constructed by irradiating two construction beams having different incidence angles onto a hologram record medium to form interference fringe patterns therein. The hologram is reconstructed by irradiating a reconstruction beam onto the interference fringe patterns so as to diffract the reconstruction beam in accordance with the interference fringe patterns. At least one of the two construction beams irradiates the hologram record medium through at least one optical deviation element. The incidence angle of the reconstruction beam is different from that of each construction beam and is arranged to be nearly a Bragg angle at any point of the hologram.

9 Claims, 12 Drawing Sheets

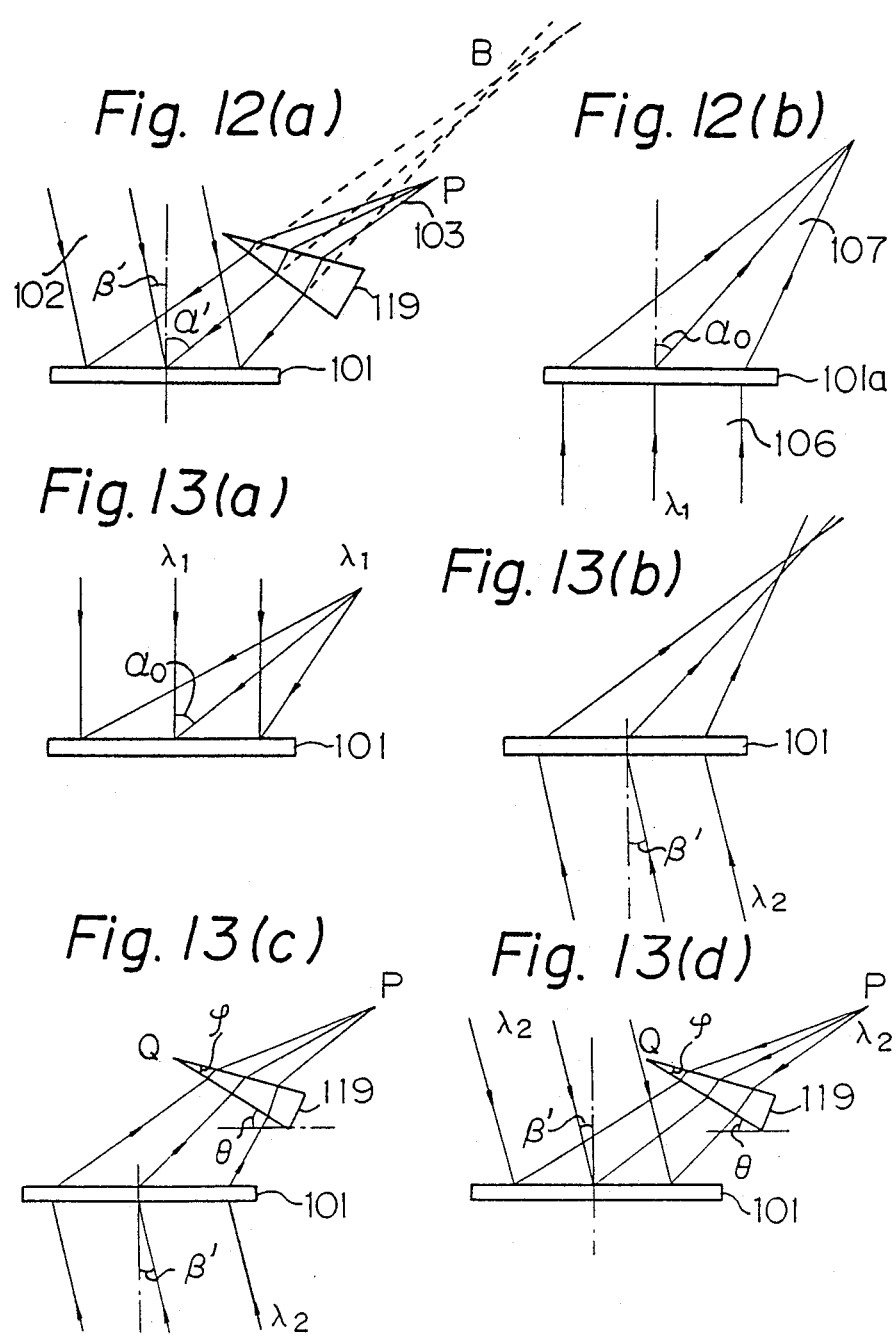

METHOD FOR CONSTRUCTING AND RECONSTRUCTING HOLOGRAM

This is a continuation of co-pending application Ser. No. 655,572, filed on Sept. 28, 1984, now abandoned.

BACKGROUND OF THE INVENTION

The present invention relates constructing a hologram by optical interference of two coherent light beams and reconstructing the hologram.

A conventional method for constructing and reconstructing a hologram is illustrated in FIGS. 1 and 2. A plane wave light beam 2 and a spherical wave light beam 3 are irradiated onto a hologram record medium 1 (photosensitive film) such as silver halide or dichromated gelatin. These two hologram construction light beams 2 and 3 optically interfere with each other and interference fringe patterns 4 are formed on the photosensitive film 1. The hologram is recorded on the photosensitive film 1 by developing and fixing the interference fringes 5 are formed on the photosensitive film 1. An interference pattern is recorded on the beam 2 is a beam comprising rays of the same optical phase on each plane perpendicular to the propagation direction. The spherical wave light beam 3 is a beam radiated from a point or converging to a point and comprising rays of the same optical phase on a spherical surfaces. Interference fringes 5 are also formed in the sectional portion of the photosensitive film 1. The inclination angle of each interference fringe 5 depends upon the incidence angles of the hologram construction light beams 2 and 3.

When the hologram is to be reconstructed, a reconstruction plane wave light beam 6 is irradiated onto the hologram record in the direction opposite to that of the irradiation of the construction beam 2, as illustrated in FIG. 2. The reconstruction beam 6 is diffracted in the direction opposite to that of the other construction beam 3 at each point of the hologram, illustrated as a reconstructed beam 7.

Such a hologram is used, for example, as a point-of-sale (POS) scanner, as illustrated in FIG. 3. A laser beam 10 from a laser generating device 9 is irradiated onto a rotary hologram disc 8 comprising a transparent base plate upon which the holograms are fabricated. The diffracted reconstructed beam 10' irradiates and scans a barcode label 12 fixed to an article 11. The scanning beam 10' is back scattered from the barcode label 12 and a part of the scattered beam 13 passes through the hologram disc 8 and is again diffracted there. The diffracted beam 13 is detected by a detector 15 through a lens 14, thereby enabling the barcode number to be read.

In such a hologram scanner, the luminous intensity of the diffracted beam 13 must be high so as to upgrade the reliability of the detection of the barcode number. Therefore, the diffraction efficiency of the hologram, which is defined as the ratio of the diffracted output beam luminous intensity to the input beam luminous intensity, must be large.

Also, the diameter of the beam spot 16 (FIG. 4) irradiated by the scanning beam 10' on the barcode label 12 must be smaller than the gap between two adjacent bars 17, to obtain a signal 18 in response to the arrangement of the bars 17. If the beam spot is too large or deformed due to aberration of the beam, as illustrated in FIG. 5, the strength of the scanning signal 18a is reduced and the detection ability is degraded.

In the conventional hologram construction and reconstruction method, the hologram record medium swells or shrinks by chemical treatment during the developing process of the photosensitive film. FIG. 6(a) represents a conventional hologram construction process in which a plane wave light beam 2, which is irradiated perpendicularly to the photosensitive film 1, and a spherical wave light beam 3 having an incident angle of $a_O$ at a point around the center of the photosensitive film 1, form interference fringes 5 on the film 1. When the photosensitive film 1 is developed, its thickness changes as illustrated in FIG. 6(b). Therefore, the inclination angle of each interference fringe 5 is changed. If a reconstruction beam 6 irradiates the shrunken hologram record medium (developed photosensitive film) 1a perpendicularly from the lower side of the hologram, the reconstructed beam 7 is diffracted in the direction opposite to that of the construction beam 3, since the interference fringe patterns on the hologram record medium surface do not change if the thickness of the hologram record medium changes. Regarding the reconstruction beam 6 and reconstructed beam 7, the inclination angle of each interference fringe 5 illustrated in FIG. 6(a) is an optimum angle, and thus the incidence angle of the reconstruction beam 6 is equal to the Bragg angle which is defined as the incidence angle of the reconstruction beam with respect to the hologram record medium surface, wherein the diffraction efficiency is maximized. Therefore, the inclination angle of each interference fringe 5 illustrated in FIG. 6(b) after the thickness change of the hologram record medium is no longer the optimum angle with result that the incidence angle of the reconstruction beam 6 is not equal to the Bragg angle. Accordingly, the diffraction efficiency is lowered so that the luminosity of the reconstructed beam is reduced.

In order to avoid such a degradation of the diffraction efficiency due to the change of the hologram record medium thickness, the off-set angle method is conventionally used. In this method, the incidence angles $\alpha$, $\beta$ of the construction beams 3, 2 are determined by considering the change of the inclination angle of the interference fringes, so that the changed inclination angle of each interference fringe nearly becomes the Bragg angle with respect to the reconstruction beam 6 and the reconstructed beam 7. However, the interference fringe patterns formed by this method are different from those of FIG. 6(a). Therefore, when the reconstruction beam 6 irradiates the hologram perpendicularly from below, as illustrated in FIG. 7(b), the aberration of the reconstructed beam 7 becomes large, which causes an obscure beam having a large diameter and deformation of the beam.

Another conventional method for compensating for the change of the inclination angle of the interference fringes is the hologram copying method. In this method, the interference fringes are copied, changing the inclination angle thereof without changing the patterns thereof, from a master hologram 1a having desired interference fringe patterns to another hologram record medium 1b, by irradiating a coherent plane wave light beam having an incidence angle of $\theta$ to the master hologram 1a, as illustrated in FIG. 8(a). A desired inclination angle of the interference fringes can be obtained by changing angle $\theta$. However, in this method, unnecessary beams are reconstructed due to noise from unnecessary diffracted beams generated during the copying process, as illustrated in FIG. 8(b), so that the beam spot is obscured when used as a scanning beam and the S/N (signal/noise) ratio is degraded.

Also, in the conventional hologram construction and reconstruction method, when a beam having a wavelength of $\lambda_1$ is to be used for reconstruction of the hologram and when the sensitivity of the photosensitive film is insufficient for the beam having a wavelength of $\lambda_1$, construction beams having a wavelength of $\lambda_2$, which can be sensed by the photosensitive film, must be used. In such a case, i.e., constructing the hologram by using beams having a wavelength of $\lambda_2$, as illustrated in FIG. 9(a), and reconstructing the hologram by using a beam having a wavelength of $\lambda_1$, as illustrated in FIG. 9(b), the reconstructed beam does not desirably converge at a required point and the aberration thereof is large.

SUMMARY OF THE INVENTION

Considering the above mentioned drawbacks of the prior art, an object of the present invention is to provide a method for constructing and reconstructing a hologram in which the maximum diffraction efficiency can be obtained and the reconstructed beam has a desirable small aberration.

The present invention provides a method for constructing and reconstructing a hologram, in which the hologram is constructed by irradiating two construction beams having different incidence angles onto a hologram record medium and by forming interference fringe patterns therein by the two construction beams, and the hologram is reconstructed by irradiating a reconstruction beam onto the interference fringe patterns so as to diffract the reconstruction beam in accordance with the interference fringe patterns, characterized by that at least one of the two construction beams irradiates the hologram record medium through an optical deviation means and that the incidence angle of the reconstruction beam is different from that of each construction beam and is arranged to be nearly a Bragg angle at any point of the hologram.

BRIEF DESCRIPTION OF THE DRAWINGS

FIGS. 12(a) and (b) are explanatory views of a method for constructing and reconstructing a hologram according to the present invention.

FIGS. 13(a) to (d) are explanatory views of the method for determining the arrangement of the optical deviation means in accordance with the present invention.

DESCRIPTION OF THE PREFERRED EMBODIMENTS

Figure 1:
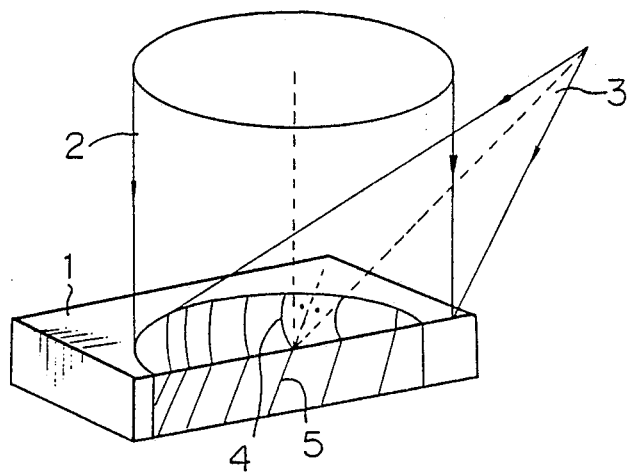
FIG. 1 is an explanatory view of a conventional hologram construction method.
Figure 2:
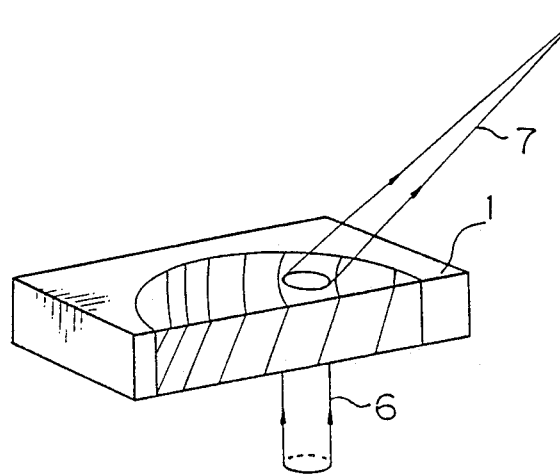
FIG. 2 is an explanatory view of a conventional method for reconstruction of the hologram constructed by the method of FIG. 1.
Figure 3:
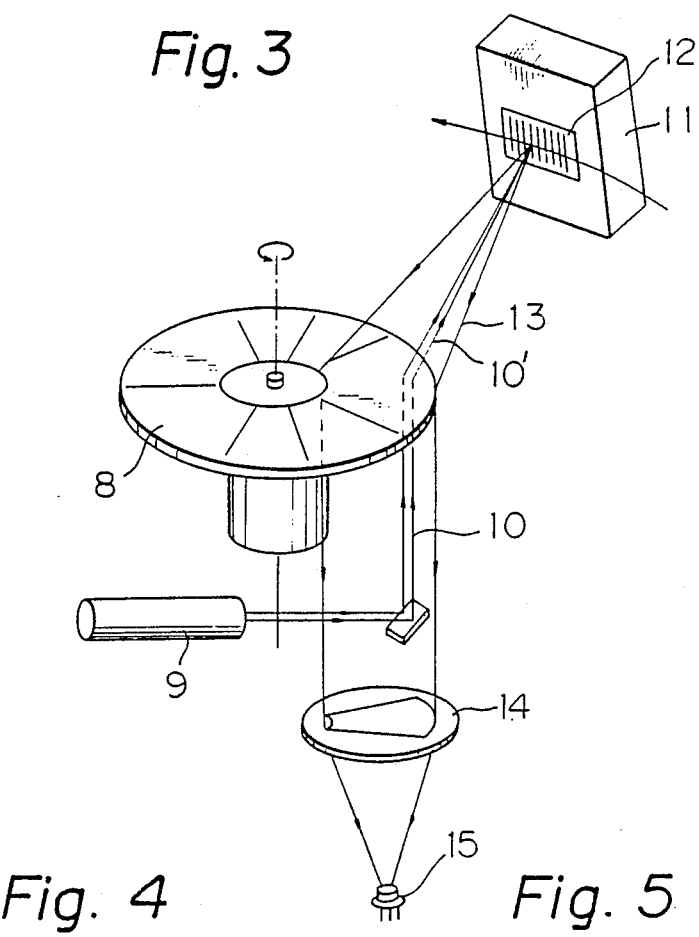
FIG. 3 is a view of main parts of a hologram scanner.
Figure 4:
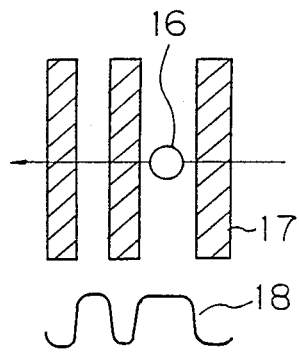
FIG. 4 is an explanatory view of a desirable scanning beam spot of the hologram scanner.
Figure 5:
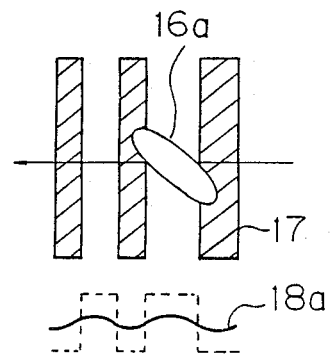
FIG. 5 is an explanatory view of an undesirable scanning beam spot of the hologram scanner.
Figure 6A:
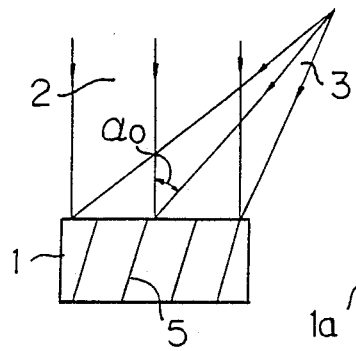
FIGS. 6(a) and (b) are explanatory views of a prior art method for constructing and reconstructing a hologram.
Figure 6B:
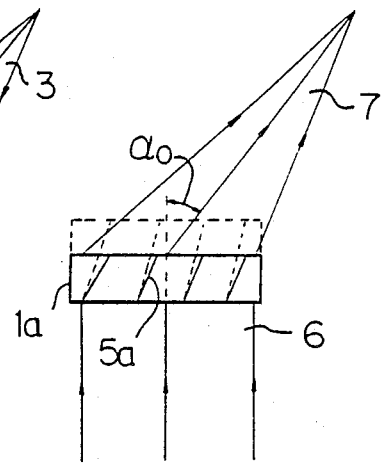
Figure 7A:
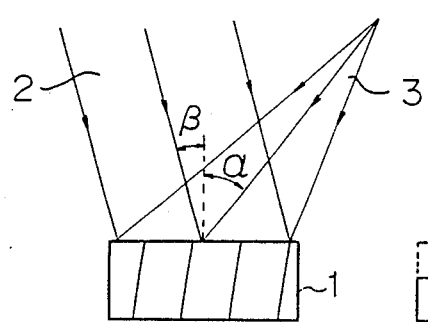
FIGS. 7(a) and (b) are explanatory views of a prior art off-set method for constructing and reconstructing a hologram.
Figure 7B:
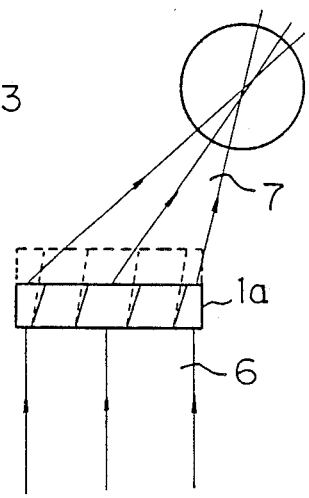
Figure 8A:
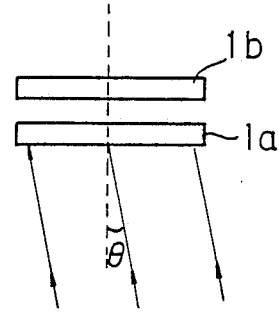
FIGS. 8(a) and (b) are explanatory views of a prior art copying method for constructing and reconstructing a hologram.
Figure 8B:
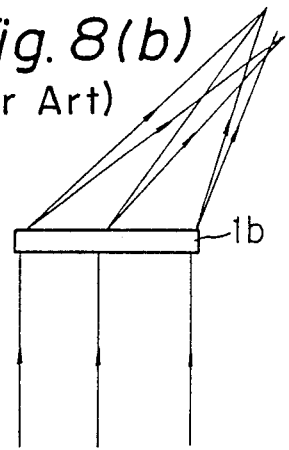
Figure 9A:
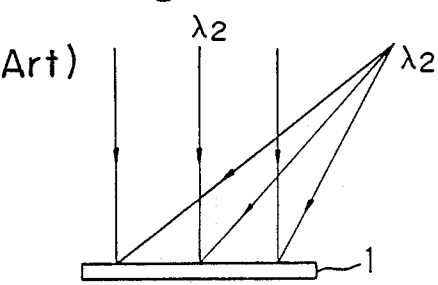
FIGS. 9(a) and (b) are explanatory views of a prior art method for constructing and reconstructing a hologram, using construction beams and a reconstruction beam having different wavelength from each other.
Figure 9B:
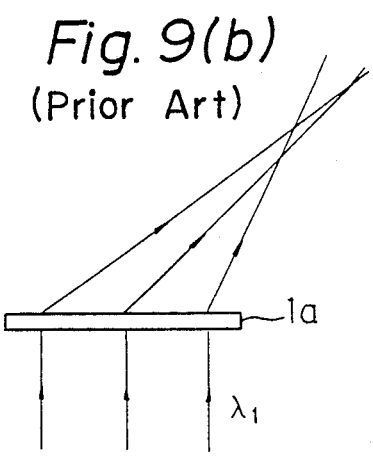
Figure 10:
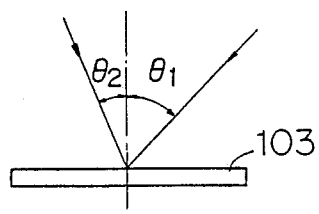
FIGS. 10 and 11 are explanatory views of the principle of the present invention.

First, an explanation is given of the principle of the present invention. The spatial frequency f of the interference fringes (the reciprocal number of the intervals of the interference fringes) defined by equation (1) below, wherein two beams having a wavelength of $\lambda$ interfere with each other at incidence angles of $\theta_1$ and $\theta_2$, respectively, as illustrated in FIG. 10.

$$f \cdot \lambda = \sin\theta_1 + \sin\theta_2 \qquad (1)$$

Figure 11:
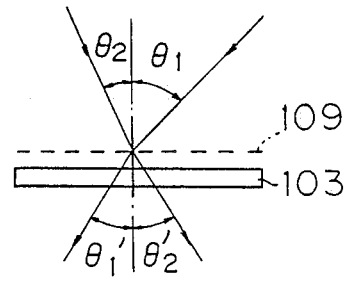

As illustrated in FIG. 11, if a very thin optical deviation element 109, such as a hologram, a transparent plate having a refractive index distribution, or a Fresnel lens, having a spatial frequency of f', is inserted close to the hologram record medium 103, the incident angles of the two beams are changed from $\theta_1$ and $\theta_2$ to $\theta_1'$ and $\theta_2'$, respectively, whereby the following equations (2) and (3) are satisfied.

$$\sin\theta_1' = \sin\theta_1 \pm f' \cdot \lambda \qquad (2)$$

$$\sin\theta_2' = \sin\theta_2 \mp f' \cdot \lambda \qquad (3)$$

When the spatial frequency of the hologram record medium 103 is designated as f'' under the condition wherein the optical deviation element 109 is inserted close to the hologram record medium 103, equation (4) below is satisfied, and equation (5) is derived from equations (1) to (4).

$$f'' \cdot \lambda = \sin\theta_1' + \sin\theta_2' \quad (4)$$

$$f'' = f \quad (5)$$

Equation (5) shows that the interference fringe patterns do not change if the thin optical deviation element is inserted close to the hologram record medium. However, the arrangement of the thin optical deviation element is not practical from the standpoints of quality and production of the hologram scanner, since unnecessary diffracted rays are generated by the thin element, which degrade the quality of the hologram, and it is not easy to produce such a thin optical deviation element.

If a thick optical deviation element is placed directly upon the hologram record medium, desirable interference fringe patterns are not obtained, since the deviation element thickness has a different effect on the two beams. For example, if a prism is used as the thick optical deviation element, the inventors found that the same deviating effect as that of the thin optical deviation element can be obtained by disposing the element apart from the hologram record medium and by selectively determining the shape and position of the element.

An embodiment of the present invention is described with reference to FIGS. 12(a) and (b). The hologram is constructed under the assumption that the hologram is to be reconstructed in the condition where the reconstruction beam 106 is a plane wave beam having a wavelength of $\lambda_1$ and which irradiates the hologram record medium 101a from below, and that the reconstructed beam 107 is converged by an angle $\alpha_O$ at a point around the center of the hologram record medium 101a, as illustrated in FIG. 12(b). The inclination angle of each interference fringe of the hologram record medium must be an optimum angle, and thus the incidence angle of the reconstruction beam 106 is equal to the Bragg angle. The hologram is constructed as illustrated in FIG. 12(a). A first construction beam, that is, a plane wave beam 102 having a wavelength of $\lambda_2$ ($\lambda_2 \geq \lambda_1$ or $\lambda_2 \leq \lambda_1$) is irradiated at an incidence angle of $\beta'$ to the hologram record medium (photosensitive film) 101. A second construction beam, that is, a spherical wave beam 103 having a wavelength of $\lambda_2$ is irradiated to the hologram record medium 101 through a prism 119 at an incidence angle of $\alpha'$ at a point around the center of the hologram record medium. Interference fringes are formed on the hologram record medium 101 by the two beams 102 and 103. The angles $\alpha'$ and $\beta'$ are calculated by taking into consideration the condition of the reconstruction of the hologram, the change of the hologram record medium thickness, and the beam wavelength. The plane wave beam 102 may be irradiated onto the hologram record medium through a prism or another optical element so as to obliquely irradiate the hologram record medium at the incidence angle of $\beta'$.

A method for determining the arrangement of the prism 119 is described with reference to FIGS. 13(a) to (d). The desired interference fringe patterns are determined on the basis of the assumption that the primary construction mode uses construction beams having a wavelength of $\lambda_1$, which is the same as that of the reconstruction beam, as illustrated in FIG. 13(a). The incidence angle $\beta'$ is determined by taking into consideration the wavelength $\lambda_2$ of the actual construction beams and the swelling or shrinking of the hologram record medium, so that the reconstruction beam irradiates the hologram record medium at the Bragg angle, thus making the diffraction efficiency nearly maximum at any point of the hologram record medium. The assumption is then made wherein the hologram is reconstructed by a reconstruction beam having a wavelength of $\lambda_2$ at an incidence angle of $\beta'$, as illustrated in FIG. 13(b). The reconstructed beam has an aberration, which makes the converging point large and obscure. The position of the apex Q, the apex angle $\emptyset$, the elevation angle $\theta$ and the position of the converging point P are calculated so that the assumed reconstructed beam of FIG. 13(b) converges at a point P by disposing the prism 119 in the assumed reconstructed beam, as illustrated in FIG. 13(c). The hologram is constructed by using the prism 119 having the arrangement determined as mentioned above, as illustrated in FIG. 13(d) which represents the same construction arrangement as that of FIG. 12(a). The hologram constructed as illustrated in FIG. 13(d) is reconstructed with high diffraction efficiency as illustrated in FIG. 12(b).

Figure 14:
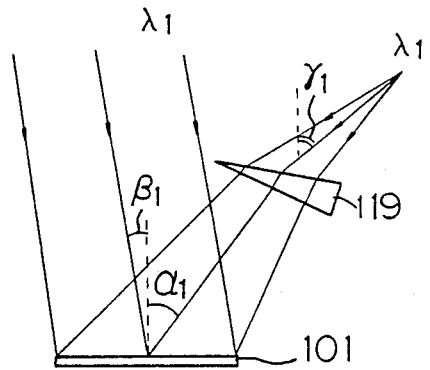
FIGS. 14 to 17 are explanatory views of different examples of the hologram construction method of the present invention.
Figure 15:
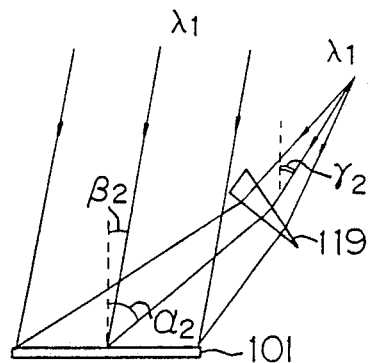
Figure 16:
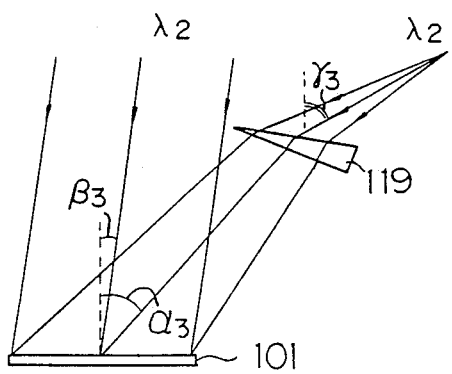
Figure 17:
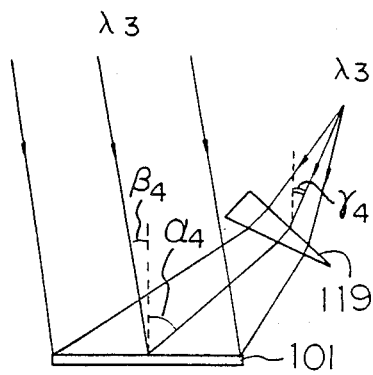

Different examples of the hologram construction method of the present invention, wherein the reconstruction condition is the same as that illustrated in FIG. 12(b), are illustrated in FIGS. 14 to 17. FIG. 14 represents the arrangement wherein $\alpha_1 < \gamma_1$, i.e., the incidence angle of the spherical wave beam is decreased by passing through the prism 119 and the hologram record medium 101 is shrunken after the development process thereof. FIG. 15 represents the arrangement wherein $\alpha_2 > \gamma_2$, i.e., the incidence angle of the spherical wave beam is increased by passing through the prism 119 and the hologram record medium 101 is inflated after the development process thereof. FIG. 16 represents the arrangement wherein the construction beam wavelength $\lambda_2 <$ reconstruction beam wavelength $\lambda_1$ and $\alpha_3 < \gamma_3$, which arrangement is similar to that of FIG. 14. FIG. 17 represents the arrangement wherein the construction beam wavelength $\lambda_3 >$ reconstruction beam wavelength $\lambda_1$ and $\alpha_4 > \gamma_4$, which arrangement is similar to that of FIG. 15. When both thickness change of the hologram record medium and difference in wavelength between the construction beam and the reconstruction beam must be taken into consideration, the arrangement is determined by combining the cases mentioned above.

Figure 18:
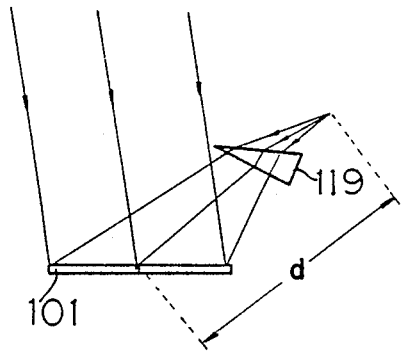
FIG. 18 is a view for explaining a situation requiring a particular arrangement of the optical deviation means of the present invention.
Figure 19:
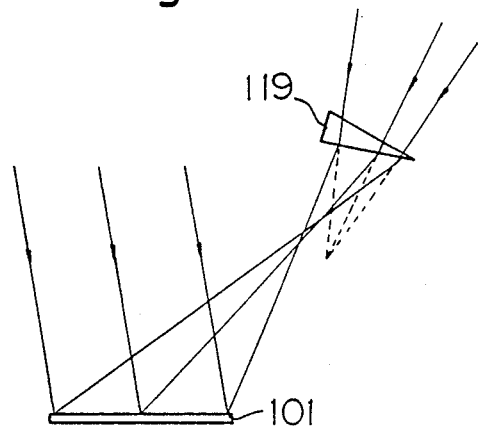
FIGS. 19 and 20 are explanatory views of different examples of the particular arrangement of the optical deviation means of the present invention.
Figure 20:
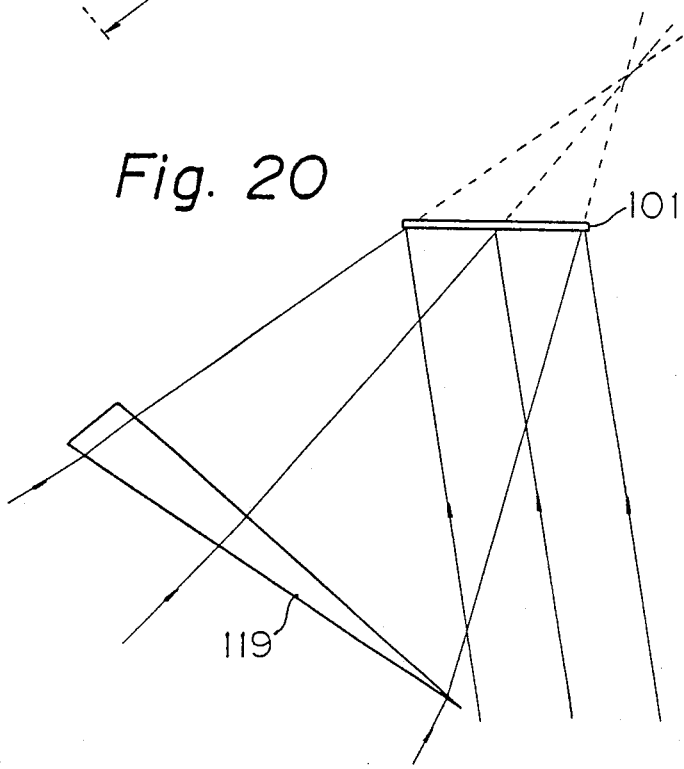

If the distance d (FIG. 18) between the point source of the spherical wave beam and the hologram record medium is very small (order of mm), it is difficult to dispose the prism 119 therebetween. In such a case, the prism 119 is arranged so that the beam is converged toward the hologram record medium, as illustrated in FIG. 19 or FIG. 20.

Figure 21:
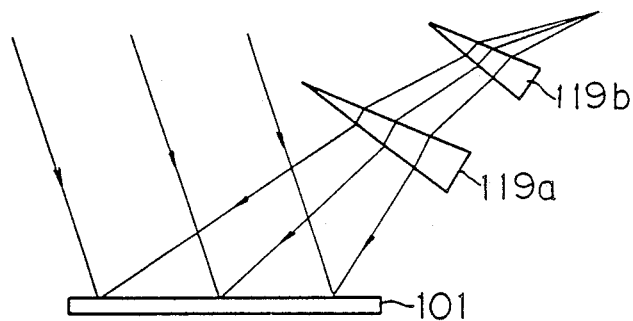
FIG. 21 is an explanatory view of a further example of the hologram construction method of the present invention.

FIG. 21 shows another example of the construction method of the present invention in which two prisms 119a and 119b are arranged in the construction spherical wave beam. In some cases, according to the size of the hologram or condition of the construction beam, a two-prism arrangement can more effectively and accurately adjust the beam than the one prism arrangement.

Figure 23:
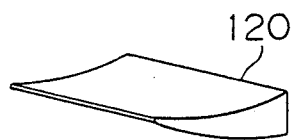
FIGS. 23 to 25 are perspective views of different lenses having the cylindrical surface used in the present invention.
Figure 24:
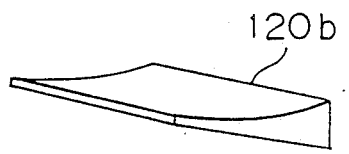
Figure 25:
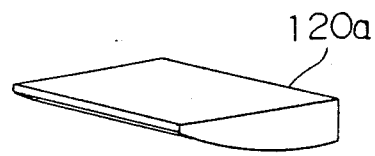
Figure 22B:
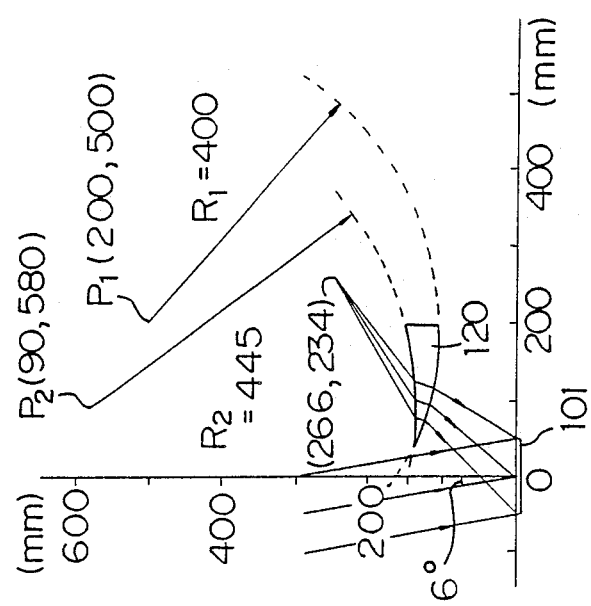
FIGS. 22(a) and (b) are explanatory views of a further arrangement of the optical deviation means of the present invention.
Figure 22A:
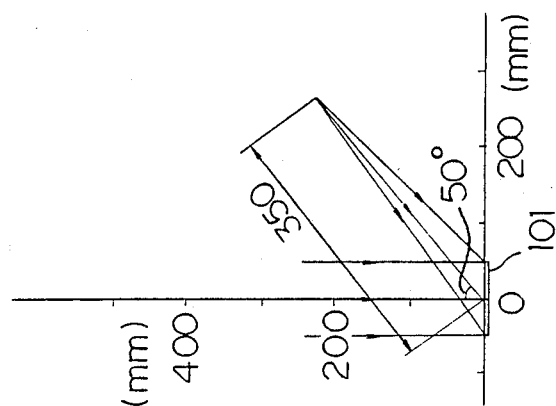

FIGS. 22(a) and (b) show an arrangement of a lens having two cylindrical surfaces and used as the optical deviation element. Such a lens 120 is arranged as illustrated in FIG. 22(b), where the primary construction mode of the hologram is as illustrated in FIG. 22(a). Points $P_1$ and $P_2$ in FIG. 22(b) represent the axes of the cylindrical surfaces, respectively. FIG. 23 shows the outer view of the lens 120 having two (upper and lower) cylindrical surfaces. FIG. 24 shows a lens having an upper concave cylindrical surface and a lower flat surface. FIG. 25 shows a lens having an upper flat surface and a lower convex cylindrical surface. The lenses of FIGS. 23 to 25 can be used as the optical deviation elements in accordance with the present invention.

Figure 26B:
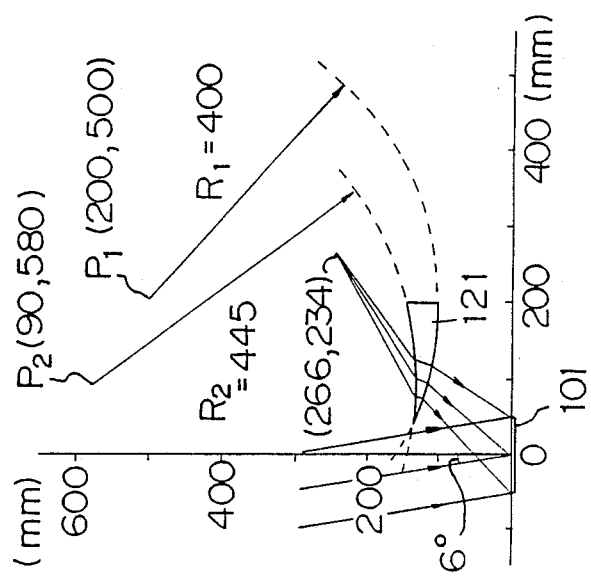
FIGS. 26(a) and (b) are explanatory views of a still further arrangement of the optical deviation means of the present invention.
Figure 26A:
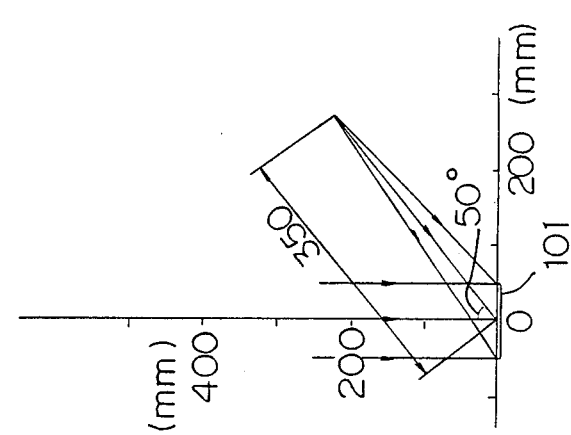
Figure 27:
FIGS. 27 to 29 are perspective views of different lenses having the spherical surface used in the present invention.
Figure 28:
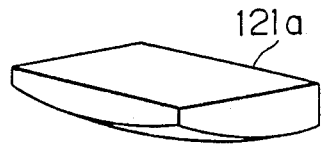
Figure 29:
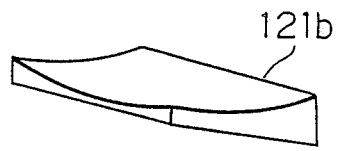

FIGS. 26(a) and (b) show an arrangement of another lens having two spherical surfaces and used as the optical deviation element of the present invention. Such a lens 121 is arranged as illustrated in FIG. 26(b), where the primary construction mode of the hologram is as illustrated in FIG. 26(a). Points $P_1$ and $P_2$ in FIG. 26(b) represent the centers of spherical surfaces, respectively. FIG. 27 shows the outer view of the lens 121 having two (upper and lower) spherical surfaces. FIG. 28 shows a lens having an upper flat surface and a lower convex spherical surface. FIG. 29 shows a lens having an upper concave spherical surface and a lower flat surface. The lenses of FIGS. 27 to 29 can be used as the optical deviation elements of the present invention.

Figure 30:
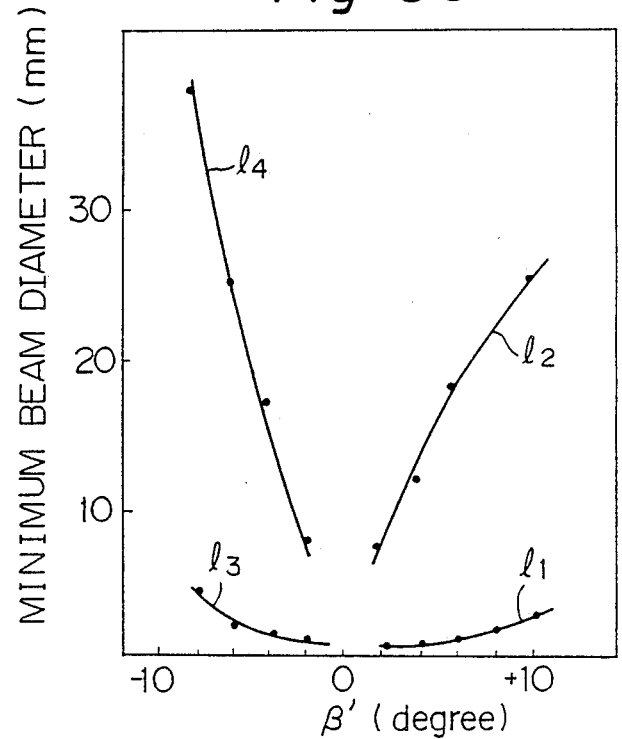
FIG. 30 is a graph showing the effect of the present invention.

The effect of the hologram construction method in accordance with the present invention is described hereinafter. FIG. 30 represents the calculation results of the minimum beam diameter at the portions P and B in FIG. 12(a), with respect to the incidence angle $\beta'$ of the plane wave beam 102 at the center of the hologram record medium 101. The portion B is the portion where the beam converges when the construction beam irradiated upon the hologram record medium 101 is reversed and the prism 119 is removed. The portion P is the portion where the beam converges when the construction beam irradiated upon the hologram record medium 101 is reversed through the prism 119. The abscissa represents $\beta'$ and the ordinate represents the minimum beam diameter. Lines $l_1$ and $l_3$ represent the calculation result of the minimum beam diameter at the converging portion P and lines $l_2$ and $l_4$ represent the calculation result of the minimum beam diameter at the converging portion B. As can be seen from the graph, the beam diameter at the portion P is very small compared with the beam diameter at the portion B. Therefore, if a point light source is to be disposed at the center of the converging portion P or B, the beam from the light source at the portion P in accordance with the present invention can more accurately irradiate the hologram record medium than the beam from the light source at the portion B in accordance with the conventional off-set method.

Figure 31:
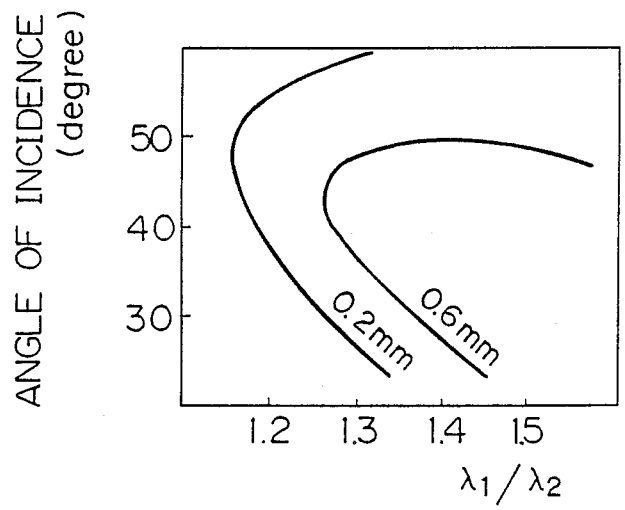
FIG. 31 is a graph representing the distance between the most deformed portions of the reconstructed beam of the present invention.
Figure 32:
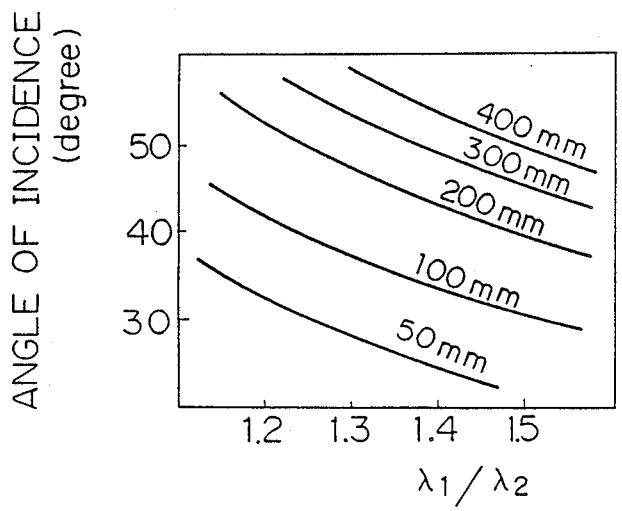
FIG. 32 is a graph representing the distance between the most deformed portions of the reconstructed beam of the prior art.

FIG. 31 is a graph of the calculation results of the distance between the most deformed portions of the beam deformed in two directions perpendicular to each other (astigmatic difference), when the construction beam wavelength is different from the reconstruction beam wavelength, in accordance with the present invention. The calculation was made assuming that the incidence angle of the reconstruction beam is equal to the diffracted angle, i.e., angle of the output beam with respect to the normal line of the hologram surface. The abscissa represents the wavelength ratio $\lambda_1/\lambda_2$ and the ordinate represents the incidence angle of the reconstruction beam. If the distance between the most deformed portion of the reconstructed beam deformed in a first direction and the most deformed portion of the same beam deformed in a second direction perpendicular to the first direction is small, the beam has a small aberration, and thus the deformation is small and a desirable small beam spot can be obtained FIG. 32 represents calculation results obtained in the same condition as that of FIG. 31, with respect to the prior art. As can be seen from FIGS. 31 and 32, in accordance with the present invention, a small beam spot can be obtained when compared with the prior art method.

In the aforementioned description of the embodiments of the present invention, a plane wave beam which irradiates the hologram record medium perpendicularly from the lower side thereof is used as the reconstruction wave. However, the reconstruction wave is not limited to such a plane wave. Namely, the reconstruction wave may be a spherical wave beam and obliquely irradiate the hologram record medium. Also, both construction waves may be a spherical wave beams.

We claim:

1. A method of constructing and reconstructing a hologram, comprising:

constructing the hologram by irradiating a hologram recording medium with two construction beams in respective optical paths of different incident angles and forming an interference pattern comprising interference fringes therein, and reconstructing the hologram by irradiating a reconstruction beam onto said interference pattern of the hologram recording medium so as to diffract said reconstruction beam in accordance with interference pattern formed therein for producing a reconstructed beam, the constructing step utilizing at least one optical deviation element disposed in the path of, and for deviating, at least one of said two construction beams by passing same therethrough, and the reconstructing step being performed by irradiating the interference pattern of the recording medium with the reconstruction beam in an optical path which is not aligned with the path of either of the construction beams and at an incident angle which is at the Bragg angle with respect to all of said interference fringes of the interference pattern formed in the hologram recording medium, to thereby focus the reconstructin beam and to compensate for a thickness change of the hologram recording medium by chemical processing and/or a difference in the wavelengths of the construction and reconstruction beams, as respectively utilized at the time of construction of the hologram and at the time of reconstruction thereof, calculating the spatial frequency from a desired reconstruction geometry, which includes the incident angles of the reconstruction and reconstructed beams defined with the optical axes of the beams, and the focal lengths of the reconstruction and reconstructed beams measured along the optical axes, calculating the incident angle and the diffraction angle for the construction wavelength, from said calculated spatial frequency, correcting the incident angle and the diffraction angle for the construction wavelength to satisfy the Bragg condition before the thickness change of the medium, by considering the thickness change ratio, which can be determined by experiment, before and after the hologram processing, performing a ray tracing procedure where one of the construction beams is assumed to be a plane wave or spherical wave and illuminating said hologram with the plane or spherical wave, and selecting the shape and position of the optical deviation element to make the diffracted beam transmitted through the deviation element, substantially identical to a plane wave or a spherical wave.

2. A method according to claim 1, wherein at least one of said two construction beams is a spherical wave.

3. A method according to claim 2, wherein said first construction beam is a spherical wave.

4. The method of claim 2, wherein both of the construction beams are spherical waves.

5. A method according to claim 1, wherein a plurality of said optical deviation elements are disposed in said first construction beam path.

6. A method according to claim 1, wherein the reconstruction beam wavelength is different from the construction beam wavelength.

7. The method of claim 1, wherein the reconstruction beam is a plane wave which irradiates the hologram perpendicularly.

8. The method of claim 1, wherein the reconstruction beam is a spherical wave which irradiates the hologram obliquely.

9. A method according to claim 1, wherein said at least one optical deviation element is one of a prism, a lens having a cylindrical surface, a decentered spherical lens, and a diffraction grating which works as a prism, a lens having a cylindrical surface and a decentered spherical lens.

* * * * *

UNITED STATES PATENT AND TRADEMARK OFFICE
CERTIFICATE OF CORRECTION

PATENT NO. : 4,968,108

DATED : November 6, 1990

INVENTOR(S) : Hiroyuki Ikeda et al

It is certified that error appears in the above-identified patent and that said Letters Patent is hereby corrected as shown below:

Col. 1, line 9, after "relates" insert --to a method for--;
line 19, change "fringe patterns 4" to --fringes 5--;
lines 20-25 change "The hologram is recorded on the photosensitive
film 1 by developing and fixing the interference fringes 5 are formed
on the photosensitive film 1. An interference pattern is recorded
on the beam 2 is a beam comprising rays of the same optical phase
on each plane perpendicular to the propagation direction."
to read --An interference pattern is recorded on the photosensitive film 1
by developing and fixing the interference fringe 5. The plane
wave light beam 2 is a beam comprising rays of the same optical
phase on each plane perpendicular to the propagation direction.--.

Col. 8, line 42, change "reconstructin" to --reconstruction--.

Signed and Sealed this

Twenty-first Day of July, 1992

Attest:

DOUGLAS B. COMER

*Attesting Officer*  *Acting Commissioner of Patents and Trademarks*